(12) United States Patent
Kato et al.

(10) Patent No.: US 10,994,385 B2
(45) Date of Patent: May 4, 2021

(54) VIBRATION STATE DETECTION DEVICE AND MACHINE TOOL INCLUDING VIBRATION STATE DETECTION DEVICE

(71) Applicant: DMG MORI Co., Ltd., Yamatokoriyama (JP)

(72) Inventors: Yasutaka Kato, Yamatokoriyama (JP); Hisayoshi Morita, Yamatokoriyama (JP)

(73) Assignee: DMG MORI Co., Ltd., Nara (JP)

( * ) Notice: Subject to any disclaimer, the term of this patent is extended or adjusted under 35 U.S.C. 154(b) by 0 days.

(21) Appl. No.: 16/480,438

(22) PCT Filed: Aug. 16, 2017

(86) PCT No.: PCT/JP2017/029456
§ 371 (c)(1),
(2) Date: Jul. 24, 2019

(87) PCT Pub. No.: WO2018/138949
PCT Pub. Date: Aug. 2, 2018

(65) Prior Publication Data
US 2019/0389023 A1    Dec. 26, 2019

(30) Foreign Application Priority Data
Jan. 27, 2017 (JP) .............................. JP2017-013209

(51) Int. Cl.
*B23Q 17/24* (2006.01)
*B23Q 17/12* (2006.01)

(52) U.S. Cl.
CPC ............ *B23Q 17/24* (2013.01); *B23Q 17/12* (2013.01); *G05B 2219/37434* (2013.01)

(58) Field of Classification Search
CPC .................. B23Q 17/24; B23Q 17/12; G05B 2219/37434
See application file for complete search history.

(56) References Cited

U.S. PATENT DOCUMENTS 6,822,415 B1 * 11/2004 Komiya ................. H02P 29/50
318/560
8,229,598 B2   7/2012 Suzuki et al.
(Continued)

FOREIGN PATENT DOCUMENTS

| CN | 1432210 A | 7/2003 |
|---|---|---|
| CN | 101380719 A | 3/2009 |
| CN | 101722438 A | 6/2010 |
| CN | 102554685 A | 7/2012 |

(Continued)

*Primary Examiner* — Ziaul Karim
(74) *Attorney, Agent, or Firm* — The Webb Law Firm (57) ABSTRACT

A vibration state detection device includes an imaging device configured to image at least one driven element to be driven by a drive unit of a machine tool; and a vibration state analysis unit configured to calculate a parameter corresponding to vibration of the driven element, based on image data for each predetermined period of elapsed time acquired by the imaging device. The parameter includes at least a vibration frequency and a machine tool including the vibration state detection device. Accordingly, it is possible to reliably obtain a parameter corresponding to vibration caused by cutting, even if cutting oil, chips, or the like adheres to a tool of a machine tool, and it is possible to suppress vibration caused by cutting.

8 Claims, 7 Drawing Sheets

(56) References Cited

U.S. PATENT DOCUMENTS

| | | | |
|---|---|---|---|
| 8,374,717 B2 | 2/2013 | Suzuki et al. | |
| 8,988,691 B2 | 3/2015 | Bihr et al. | |
| 9,011,052 B2 | 4/2015 | Ueno | |
| 2009/0069927 A1* | 3/2009 | Suzuki | B23Q 17/0976 700/177 |
| 2012/0093603 A1* | 4/2012 | Ueno | G05B 19/404 409/79 |
| 2012/0101624 A1* | 4/2012 | Ueno | B23Q 17/0976 700/173 |
| 2014/0333249 A1* | 11/2014 | Sonoda | G05B 19/404 318/619 |
| 2015/0356835 A1 | 12/2015 | Matsumoto | |
| 2016/0252896 A1* | 9/2016 | Nakamura | G05B 11/011 318/611 |
| 2016/0346891 A1 | 12/2016 | Ando | |

FOREIGN PATENT DOCUMENTS

| | | |
|---|---|---|
| CN | 102785126 A | 11/2012 |
| CN | 105328509 A | 2/2016 |
| CN | 105932930 A | 9/2016 |
| EP | 3078454 A1 | 10/2016 |
| JP | 5269651 A | 10/1993 |
| JP | 6155239 A | 6/1994 |
| JP | 2001179620 A | 7/2001 |
| JP | 2007190628 A | 8/2007 |
| JP | 200882702 A | 4/2008 |
| JP | 201099801 A | 5/2010 |
| JP | 2010204590 A | 9/2010 |
| JP | 2012023834 A | 2/2012 |
| JP | 201298149 A | 5/2012 |
| JP | 2013132706 A | 7/2013 |
| JP | 20142152 A | 1/2014 |
| JP | 2016224695 A | 12/2016 |

* cited by examiner

VIBRATION STATE DETECTION DEVICE AND MACHINE TOOL INCLUDING VIBRATION STATE DETECTION DEVICE

This application is the United States national phase of International Application No. PCT/JP2017/029456 filed Aug. 16, 2017, and claims priority to Japanese Patent Application No. 2017-013209 filed Jan. 27, 2017, the disclosures of which are hereby incorporated by reference in their entirety.

TECHNICAL FIELD

The present invention relates to a device configured to detect a state of vibration to be generated while cutting, and a machine tool including such a vibration state detection device.

BACKGROUND ART

In a machine tool configured to perform processing by rotating a tool or a workpiece, there is a possibility that the processing accuracy of the workpiece may lower due to vibration to be generated during processing of the workpiece. In order to deal with such a possibility, for example, there is proposed a dynamic characteristic calculation device of a machine tool in which a high-speed camera is disposed beside a rotating tool so that the characteristic of vibration of the tool can be calculated from an image of the tool captured by the high-speed camera (see Patent Literature 1, for example).

CITATION LIST

Patent Literature

Patent Literature 1: JP 2013-132706 A

SUMMARY OF INVENTION

Technical Problem

In a device described in Patent Literature 1, an outer edge of the rotating tool is detected from image data including the rotating tool, and the displacement amount of the rotating tool is calculated. However, if cutting oil, chips, or the like adheres to the rotating tool, there is a possibility that the outer edge of the rotating tool cannot be defined and the displacement amount of the rotating tool cannot be measured. In such a case, there is a possibility that the vibration characteristic of the rotating tool cannot be obtained in an actual cutting process by a machine tool.

The present invention has been made in view of the above problems, and it is an object thereof to provide a vibration state detection device that can reliably obtain a parameter corresponding to vibration to be caused by cutting, even if cutting oil, chips, or the like adheres to a tool of a machine tool, and a machine tool that includes such a vibration state detection device and can suppress vibration to be caused by cutting.

Solution to Problem

In order to solve the above problems, a vibration state detection device according to an aspect of the present invention includes:

an imaging device configured to image at least one driven element to be driven by a drive unit of a machine tool; and
a vibration state analysis unit configured to calculate a parameter corresponding to vibration of the driven element, based on image data for each predetermined period of elapsed time acquired by the imaging device, and
the parameter includes at least a vibration frequency.

A machine tool according to an aspect of the present invention includes:
the above vibration state detection device; and
a drive control unit configured to feedback-control the drive unit based on a parameter corresponding to vibration, the parameter being calculated by the vibration state detection device.

Advantageous Effects of Invention

It is possible with a vibration state detection device of the above aspect to reliably obtain a parameter corresponding to vibration caused by cutting, even if cutting oil, chips, or the like adheres to a tool of a machine tool, and it is possible with a machine tool including a vibration state detection device to suppress vibration caused by cutting.

DESCRIPTION OF EMBODIMENTS

Hereinafter, various embodiments for carrying out the present invention will be described with reference to the drawings. In the drawings, corresponding members having the same functions are denoted by the same reference numerals. Although the embodiments are illustrated separately for convenience in consideration of the ease of description or understanding of the main points, partial replacement or combination of configurations illustrated in different embodiments is possible. In the second and subsequent embodiments, descriptions of matters in common with the first embodiment will be omitted, and only different points will be described. In particular, similar effects by similar configurations will not be referred to one by one in each embodiment.

In a perspective view illustrating a machine tool, the moving direction (front and back) of a processing table is expressed as Z axis, the horizontal moving direction (left and right) of a saddle is expressed as X axis, and the vertical moving direction (up and down) of a spindle head is expressed as Y axis.

Vibration State Detection Device 100 According to the First Embodiment

Figure 1:
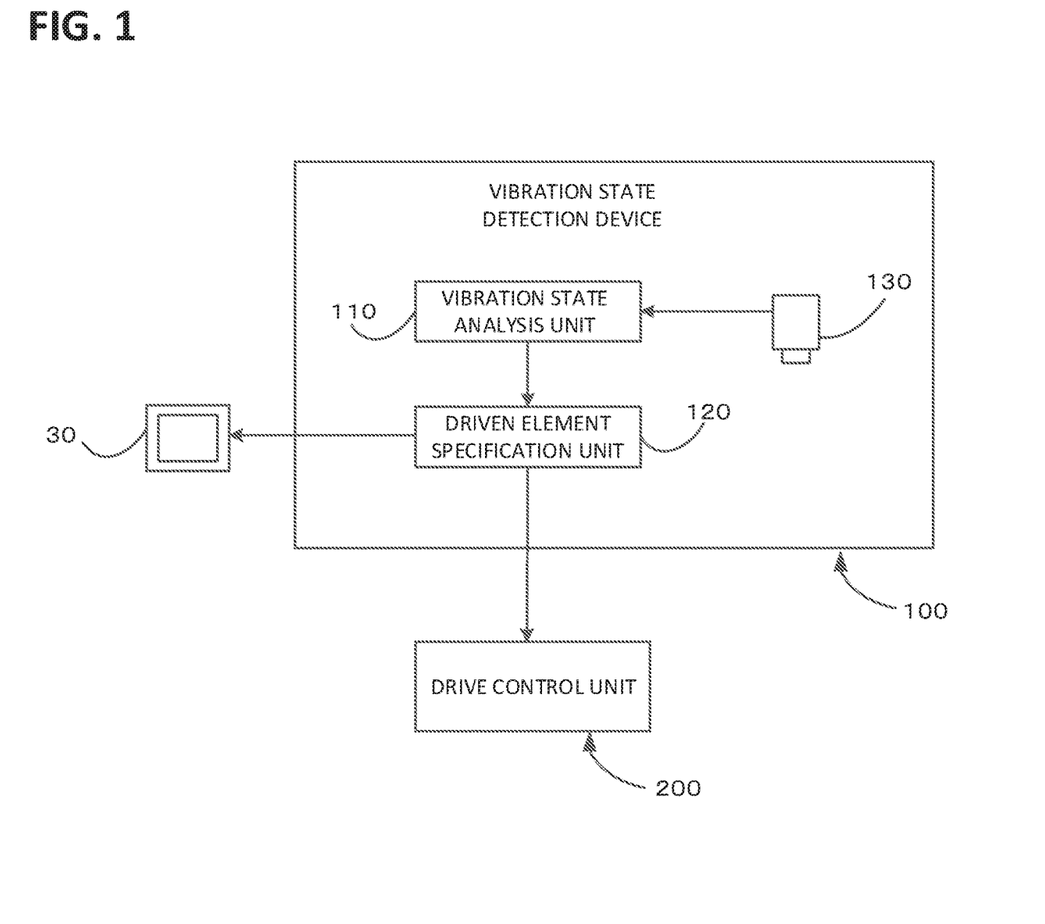
FIG. 1 is a block diagram illustrating a configuration of a vibration state detection device according to a first embodiment of the present invention.
Figure 2:
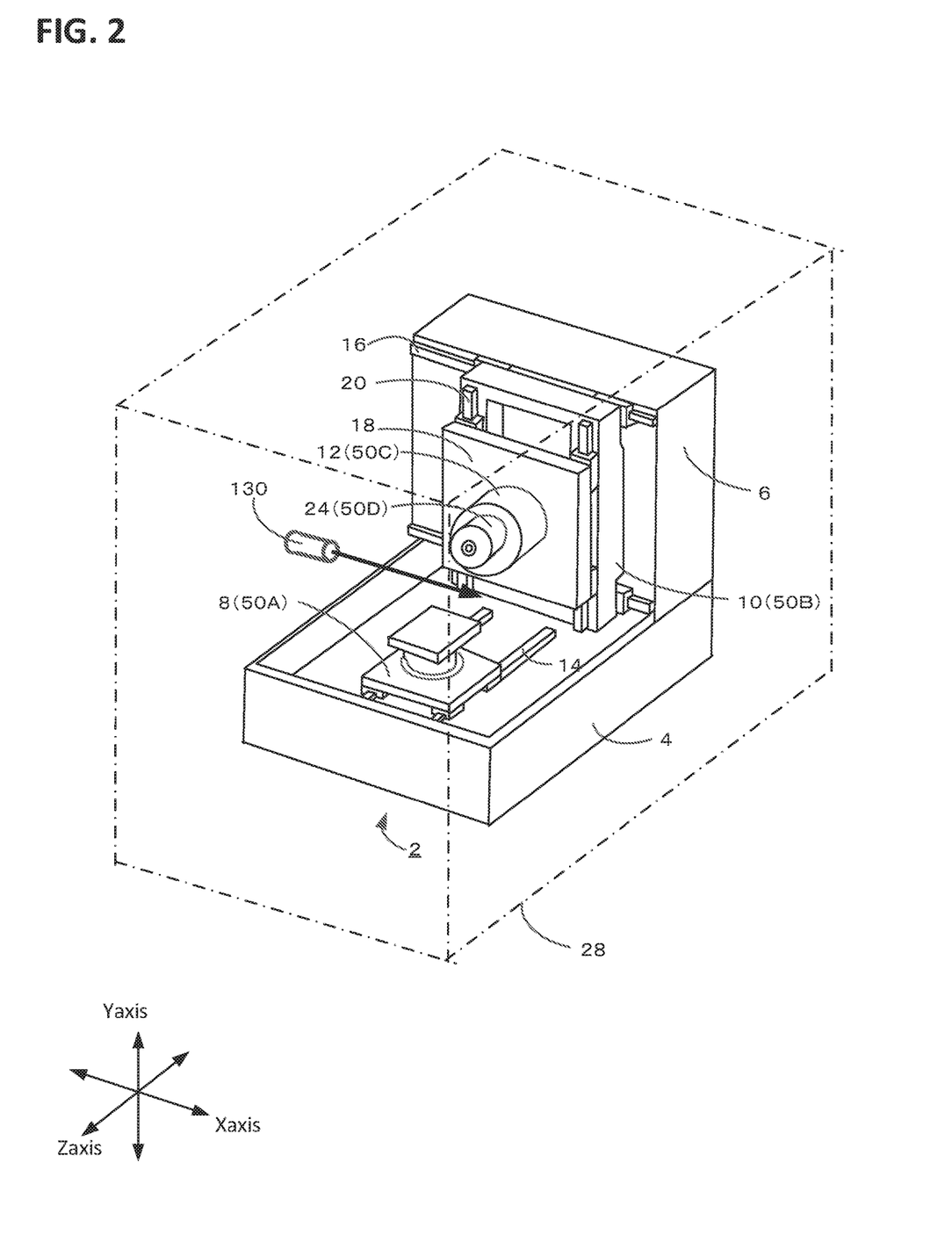
FIG. 2 is a perspective view schematically illustrating an arrangement example of an imaging device in a machine tool including a vibration state detection device of the present invention.

FIG. 1 is a block diagram illustrating a configuration of a vibration state detection device according to the first embodiment of the present invention. It is to be noted that arrows in FIG. 1 indicate transmission directions of signals. FIG. 2 is a perspective view schematically illustrating an arrangement example of an imaging device in a machine tool including a vibration state detection device of the present invention.

The vibration state detection device 100 according to this embodiment includes:

(1) an imaging device 130 configured to image at least one of driven elements (e.g., a processing table 8, a saddle 10, a spindle head 12, and a main spindle 24) driven by a drive unit (e.g., servomotors 50A to 50D) provided in a machine tool 2;

(2) a vibration state analysis unit 110 configured to calculate a parameter corresponding to vibration of a driven element, based on image data for each predetermined period of elapsed time acquired by the imaging device 130; and (3) a driven element specification unit 120 configured to specify a driven element requiring control to suppress vibration, based on the parameter corresponding to vibration, the parameter being calculated by the vibration state analysis unit 110.

As illustrated in FIG. 1, a signal is transmitted from the vibration state detection device 100 (driven element specification unit 120) to a drive control unit 200 and a display device 30, which are configured as a part of a control device of the machine tool 2. The vibration state analysis unit 110 and the driven element specification unit 120 can be configured as a part of a control device of the machine tool 2, or can be provided in the vibration state detection device 100 existing as an external device and electrically connected with a control device of the machine tool 2 via a cable or the like. The display device 30 can also be provided in the machine tool 2, or can be provided in the vibration state detection device 100 existing as an external device.

<Machine Tool 2>

Next, an outline of the machine tool 2 illustrated in FIG. 2 will be described. Although FIG. 2 illustrates a horizontal machining center as an example, the present invention is not limited thereto, and the vibration state detection device 100 can be applied to, for example, a vertical machining center or a lathe-type machine tool in which a workpiece rotates.

A bed 4 that functions as a base of the machine tool 2 has a rectangular shape in plan view. At a back end portion of the bed 4, a gate-shaped column 6 is disposed and fixed in an upright state so as to form an L-shaped side shape together with the bed 4. The processing table 8 driven by a servomotor 50A is disposed on the bed 4 and on the front side of the column 6 so as to be movable in the Z-axis (front and back) direction. The saddle 10 driven by a servomotor 50B is disposed on the front face of the column 6 so as to be movable in the X-axis (left and right) direction. Moreover, a spindle base 18 driven by a servomotor 50C is disposed on the saddle 10 so as to be movable in the Y-axis (up and down) direction.

The processing table 8 is supported by a pair of left and right guide rails 14, 14, which are arranged on the bed 4, so as to be movable in the Z-axis direction. The saddle 10 is supported by a pair of upper and lower guide rails 16, 16, which are disposed at an upper end portion and a lower end portion of the column 6, so as to be movable in the X-axis direction.

The spindle base 18 is supported by a pair of left and right guide rails 20, 20, which are disposed on left and right vertical sides of the saddle 10, so as to be movable in the Y-axis direction. The spindle head 12 is fixed to the rectangular spindle base 18 with the axis thereof oriented in the Z-axis direction. Hence, it can be said that the spindle head 12 driven by the servomotor 50C is disposed so as to be movable in the Y-axis (up and down) direction.

The spindle head 12 has a cylindrical shape, and the main spindle 24 is inserted into and disposed in the spindle head 12. The main spindle 24 is rotatably supported by the spindle head 12 via a plurality of bearings. Moreover, a servomotor 50D is incorporated in the spindle head 12, and the main spindle 24 is driven to rotate by the servomotor 50D. At a front end portion of the main spindle 24, a tool holder configured to support a rotating tool is detachably mounted. Such an attachment/detachment mechanism allows various tools to be replaced and mounted.

It is possible with the above configuration to cut a workpiece mounted on the processing table 8 using a rotating tool attached to the main spindle 24. Vibration is caused by cutting resistance or the like in processing of a workpiece with a rotating tool, accompanied by feed of the workpiece by movement of the processing table 8 in the Z-axis direction, or movement of the rotating tool by movement of the saddle 10 in the X-axis direction or movement of the spindle head 12 in the Y-axis direction. In such a case, resonance may possibly occur when the natural frequency of a driven element (processing table 8, saddle 10, spindle head 12, or main spindle 24) is close to the frequency of generated vibration.

<Vibration State Detection Device 100>

The vibration state detection device 100 according to this embodiment can calculate a parameter corresponding to vibration caused by such cutting, and can judge in which driven element vibration has been generated.

In the arrangement example illustrated in FIG. 2, the imaging device 130 configured to image at least one of the driven elements (processing table 8, saddle 10, spindle head 12, and main spindle 24) is provided inside the machine tool 2 (particularly, a cover 28). More specifically, the imaging device 130 is disposed beside the bed 4 and slightly above a mounting surface of the processing table 8. The imaging device 130 is preferably a high-speed camera that has an image sensor such as a CCD or a CMOS and a lens configured to form a picked-up image on the image sensor, and in particular, can image at least 4,000 frames per second.

In a case where the imaging device 130 is disposed inside the machine tool 2, a driven element can be imaged directly, and the cover 28 can protect the imaging device 130 from the outside.

In the arrangement example illustrated in FIG. 2, the imaging device 130 is configured to image a driven element from the X-axis direction. Driven elements that can be imaged by the imaging device 130 include the processing table 8 driven by the servomotor 50A, the saddle 10 driven by the servomotor 50B, the spindle head 12 driven by the servomotor 50C, and the main spindle 24 driven to rotate by the servomotor 50D. Here, the imaging direction of the imaging device 130 does not necessarily have to coincide with the X-axis direction, and may be substantially along the X-axis direction.

In the case of the processing table 8, the saddle 10, or the spindle head 12, translational motion is driven by the drive unit (servomotors 50A to 50C), while in the case of the main spindle 24, rotational motion is driven by the drive unit (servomotor 50D). At this time, the imaging device 130 is disposed to image a driven element from a direction different from the moving direction of the driven element in a case where the processing table 8 that moves in the Z-axis direction or the spindle head 12 that moves in the Y-axis direction is a driven element.

On the other hand, the imaging device 130 is disposed to image a driven element from the same direction as the moving direction of the driven element in a case where the saddle 10 that moves in the X-axis direction is a driven element.

In the vibration state analysis unit 110, it is possible to grasp the external form of each driven element or a specific part by performing image analysis of image data acquired by the imaging device 130 using known image analysis means even in a case of any driven element including the main spindle 24 driven to rotate by the servomotor 50D. Hence, it is possible to calculate the vibration frequency, the amplitude of vibration, and the direction of vibration as parameters corresponding to vibration from a change in the external form of a driven element or in the position of a specific part illustrated in image data for each predetermined period of elapsed time.

In particular, in the case of the processing table 8 (moving in the Z-axis direction) or the spindle head 12 (moving in the Y-axis direction) where the imaging device 130 images the driven element from a direction different from the moving direction of the driven element, it is possible to reliably image displacement due to vibration, and it is therefore possible to calculate a parameter corresponding to vibration more accurately. Furthermore, it is possible to image displacement due to vibration more reliably in a case where the imaging direction of the imaging device 130 is substantially orthogonal to the moving direction of the driven element.

There is a possibility that the amplitude of vibration or the direction of vibration cannot be accurately grasped depending on the direction of imaging of the driven element. However, even in such a case, the periodic back and forth movement and the cycle thereof can be grasped, and at least the vibration frequency can be detected.

In a case where a parameter corresponding to vibration is to be calculated from a positional change of a the external form or specific part of the processing table 8, the saddle 10, the spindle head 12, or the main spindle 24 that is a driven element, a parameter corresponding to vibration at each driven element of the machine tool 2 caused by cutting, can be reliably calculated even if cutting oil, chips, or the like adheres to a rotating tool attached to the tip of the main spindle 24.

Even if cutting oil, chips, or the like adheres to a driven element, it is possible to grasp the periodic back and forth movement and the cycle thereof, and at least the vibration frequency can be detected.

In the vibration state detection device 100 according to this embodiment, the driven element specification unit 120 can specify a "driven element that requires control to suppress vibration" based on a parameter corresponding to vibration, the parameter being calculated by the vibration state analysis unit 110. For example, it can be determined that a driven element is a "driven element that requires control to suppress vibration" in a case where an amplitude calculated from image data of the driven element exceeds a predetermined threshold value. Moreover, it can be also determined that a driven element is a "driven element that requires control to suppress vibration" in a case where a vibration frequency calculated from image data of the driven element is within a predetermined range where resonance or the like is likely to occur.

<Vibration State Detection Processing>

Figure 3:
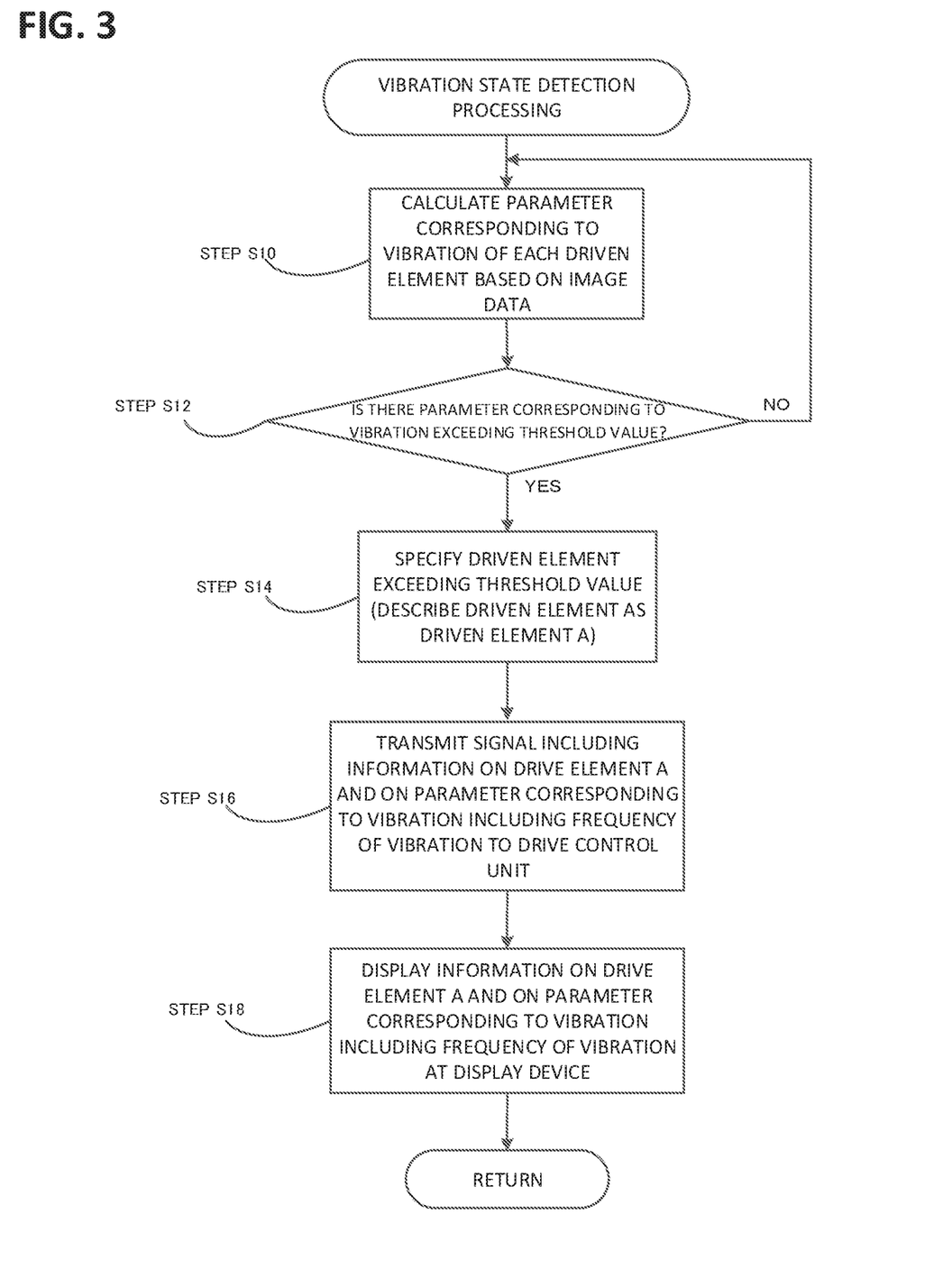
FIG. 3 is a flowchart illustrating an example of vibration state detection processing to be carried out by the vibration state detection device according to the first embodiment of the present invention.

Next, control processing for vibration state detection will be described with reference to a flowchart. FIG. 3 is a flowchart illustrating an example of vibration state detection processing to be carried out by the vibration state detection device 100 according to the first embodiment of the present invention.

In FIG. 3, the vibration state analysis unit 110 first calculates a parameter corresponding to vibration of each driven element, based on image data acquired by the imaging device 130 (step S10). Next, the driven element specification unit 120 determines whether there is a parameter that exceeds a threshold value in calculated parameters (e.g., amplitude) corresponding to vibration (step S12). If there is no parameter that exceeds the threshold value (NO), calculation in step S10 is continued until the value of the parameter exceeds the threshold value. If it is judged in this determination that there is a parameter that exceeds the threshold value (YES), a driven element corresponding to the parameter that exceeds the threshold value is specified (step S14).

When the specified "driven element that requires control to suppress vibration" is described as a driven element A, the driven element specification unit 120 then transmits a signal including information on the driven element A and on the parameter corresponding to vibration including at least a vibration frequency, to the drive control unit 200 of the machine tool 2 (step S16). Furthermore, the driven element specification unit 120 transmits a signal including information on the driven element A and on the parameter corresponding to vibration including at least a vibration frequency, to a drive circuit of the display device, displays the name of the driven element A or the parameter corresponding to the vibration at the display device 30 (step S18), and terminates the series of control processing. It is to be noted that there may be a plurality of driven elements A.

As described above, the vibration state analysis unit 110 carries out calculation based on image data for each predetermined period of elapsed time of a driven element acquired by the imaging device 130, so as to reliably obtain a parameter including at least a vibration frequency and corresponding to vibration at the machine tool 2 caused by cutting even in a case where cutting oil, chips, or the like adheres to a tool of the machine tool 2.

Furthermore, since the driven element specification unit 120 specifies a driven element A that requires control to suppress vibration based on a parameter corresponding to vibration, the parameter being calculated by the vibration state analysis unit 110, it can be applied to accurate control to suppress vibration or accurately notify an operator of the information on vibration.

Although it is determined whether a parameter corresponding to vibration exceeds the threshold value in step S12, the present invention is not limited thereto, and it can also be determined whether a parameter (e.g., a vibration frequency) corresponding to vibration is within a predetermined range.

(Drive Control Unit 200 According to the Present Invention)

Next, there is described a drive control unit 200, which is a control device configured to feedback-control the drive unit (servomotors 50A to 50D) of driven elements (processing table 8, saddle 10, spindle head 12, and main spindle 24) and can carry out control processing for suppressing vibration of a driven element driven by a drive unit based on a signal received from the vibration state detection device 100.

<Drive Control Unit 200 According to the First Embodiment>

Figure 4:
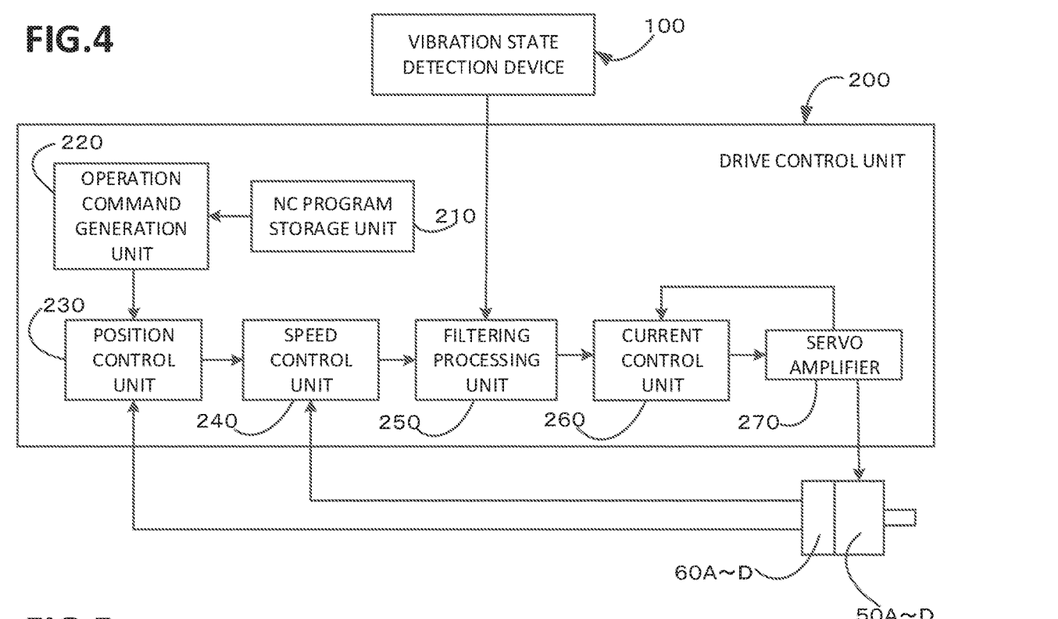
FIG. 4 is a block diagram illustrating a configuration of a drive control unit according to the first embodiment of the present invention.

First, the drive control unit 200 according to the first embodiment of the present invention will be described. FIG. 4 is a block diagram illustrating the configuration of a drive control unit according to the first embodiment of the present invention.

The drive control unit 200 according to this embodiment includes: an NC program storage unit 210 storing an NC program of the machine tool 2; an operation command generation unit 220 configured to read program data from the NC program storage unit 210; a position control unit 230 configured to receive a signal from the operation command generation unit 220; a speed control unit 240 configured to receive a signal from the position control unit 230; a filtering processing unit 250 configured to receive a signal from the speed control unit 240; a current control unit 260 configured to receive a signal from the filtering processing unit 250; and a servo amplifier 270 configured to receive a signal from the current control unit 260. A feedback signal is transmitted from the servo amplifier 270 to the current control unit 260. Moreover, the amplified signal is transmitted from the servo amplifier 270 to the servomotors 50A to 50D that are the drive unit. Rotary encoders 60A to 60D are attached respectively to the servomotors 50A to 50D, and feedback signals are transmitted to the position control unit 230 and the speed control unit 240. The filtering processing unit 250 is configured to receive a signal (signal illustrated in step S16 in FIG. 3) from the vibration state detection device 100.

In the drive control unit 200 configured as described above, the operation command generation unit 220 analyzes the NC program stored in the NC program storage unit 210, generates an operation command signal to the drive unit (servomotors 50A to 50D), and transmits the operation command signal to the position control unit 230.

Next, the position control unit 230 generates a speed command signal based on the operation command signal and a present position signal fed back from the drive unit (rotary encoders 60A to 60D), and transmits the speed command signal to the speed control unit 240. Next, the speed control unit 240 generates a current command signal based on the speed command signal and a present speed signal fed back from the drive unit (rotary encoders 60A to 60D), and transmits the current command signal to the filtering processing unit 250.

Then, the filtering processing unit 250 removes a frequency component of vibration of a driven element A (driven element that requires control to suppress vibration) from the current command signal based on the signal received from the vibration state detection device 100, and transmits a current command signal subjected to the removal processing to the current control unit 260. Then, the current control unit 260 generates a drive command signal based on the current command signal subjected to the removal processing and a present current signal fed back from the servo amplifier 270, and transmits the drive command signal to the servo amplifier 270. The servo amplifier 270 amplifies the drive command signal using a predetermined gain, and the drive command signal is transmitted to the drive unit (servomotors 50A to 50D) and is driven and controlled.

If vibration generated at the driven element A (driven element that requires control to suppress vibration) is inputted as a disturbance to a control system of the drive unit (any one of the servomotors 50A to 50D corresponding to the driven element A), the control system becomes unstable and vibrates, a frequency component of vibration is added to the present speed signal fed back from the drive unit (rotary encoders 60A to 60D), and the current command signal calculated based thereon includes a frequency component of vibration. The driven element A driven by the drive unit or the entire machine tool 2 resonates if the frequency component of vibration is close to the natural frequency of the driven element A or the entire machine tool 2.

Therefore, in the drive control unit 200 of this embodiment, the frequency component of vibration of the driven element A based on the signal received from the vibration state detection device 100 is removed by the filtering processing unit 250 from the current command signal. As a result, even if external vibration associated with cutting is inputted as a disturbance to the control system of the drive unit (servomotors 50A to 50D), the filtering processing unit 250 can appropriately remove the vibration frequency component from a current command signal including the frequency component of vibration, and therefore vibration of the drive unit (servomotors 50A to 50D) can be effectively prevented. Accordingly, it is possible to prevent vibration of the drive unit (servomotors 50A to 50D) from becoming large, and prevent deterioration of the processing accuracy such as the surface roughness due to excessive vibration.

<Drive Control Processing>

Figure 5:
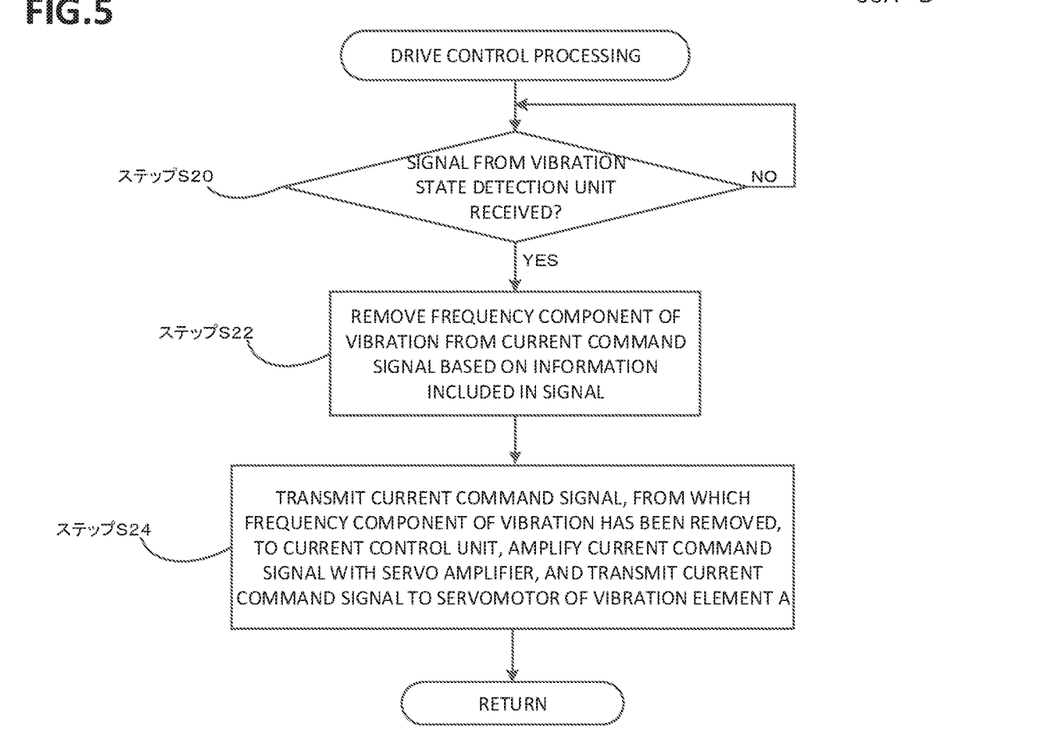
FIG. 5 is a flowchart illustrating an example of drive control processing to be carried out by the drive control unit according to the first embodiment of the present invention.

Next, drive control processing by the filtering processing unit 250 described above will be described with reference to a flowchart. FIG. 5 is a flowchart illustrating an example of drive control processing to be carried out by the drive control unit 200 according to the first embodiment of the present invention.

In FIG. 5, whether a signal has been received from the vibration state detection device 100 is determined first (step S20). It is to be noted that the standby state continues until a signal is received from the vibration state detection device 100 in a case where a signal has not been received from the vibration state detection device 100 (NO). If it is determined in this determination that a signal has been received from the vibration state detection device 100 (YES), control processing of removing a vibration frequency component of a driven element A from a current command signal is then performed for the driven element A based on information included in the received signal (step S22). Next, the current command signal from which the vibration frequency component has been removed is transmitted to the current control unit 260, the drive command signal is transmitted to the servo amplifier 270 by the current control unit 260, and the drive command signal is amplified by the servo amplifier 270 and transmitted to a drive unit (any one of the servomotors 50A to 50D) of the driven element A (step S24).

Since the frequency component of vibration of the driven element A is removed from the current command signal in such control, vibration of the driven element A can be suppressed.

As described above, in the machine tool 2 including the vibration state detection device 100 (see FIG. 1) according to the first embodiment of the present invention and the drive control unit 200 (see FIG. 4) configured to feedback-control the drive unit according to the first embodiment of the present invention, the drive control unit 200 has the filtering processing unit 250 configured to remove a frequency component of vibration of the driven element A from the current command signal transmitted to the drive unit (any one of servomotors 50A to 50D) of the specified driven element A, and it is therefore possible to suppress vibration of the driven element A and thus vibration of the entire machine tool 2. This can prevent deterioration of the processing accuracy.

It is to be noted that the vibration state detection device 100 can be configured as an external device separate from the machine tool 2.

<Drive Control Unit 200 According to the Second Embodiment>

Figure 6:
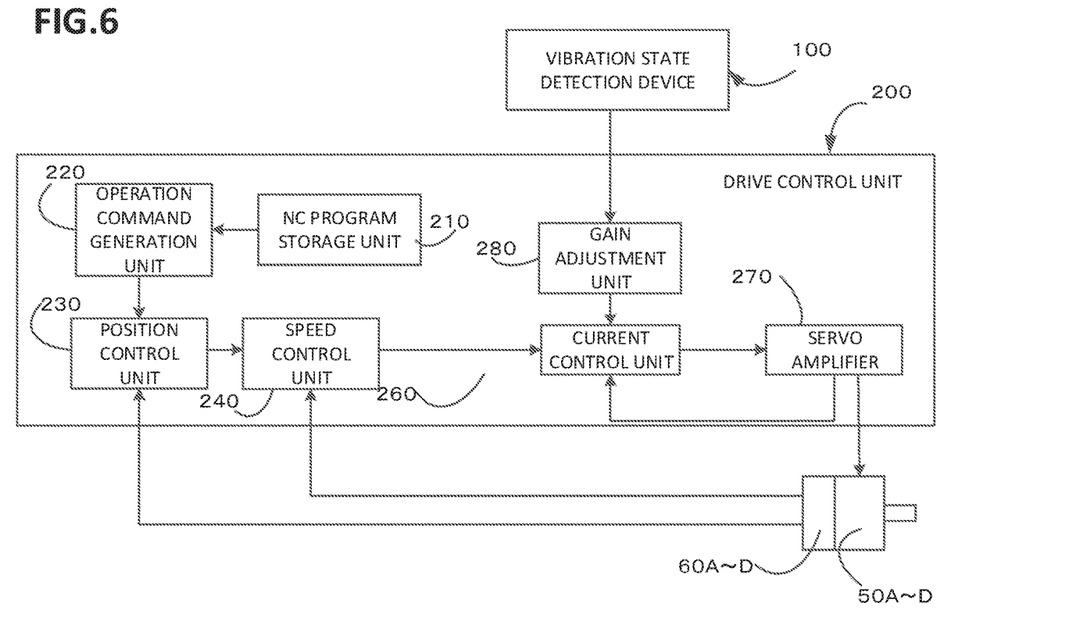
FIG. 6 is a block diagram illustrating a configuration of a drive control unit according to a second embodiment of the present invention.

Next, a drive control unit 200 according to the second embodiment of the present invention will be described. FIG. 6 is a block diagram illustrating a configuration of a drive control unit according to the second embodiment of the present invention.

The drive control unit 200 according to this embodiment is different from the first embodiment illustrated in FIG. 4 in that a filtering processing unit 250 does not exist between a speed control unit 240 and a current control unit 260, and a gain adjustment unit 280 is connected with the current control unit 260. A signal from the vibration state detection device 100 is transmitted to the gain adjustment unit 280, and a signal is transmitted from the gain adjustment unit 280 to the current control unit 260. The other configuration is basically similar to that of the first embodiment, and further description will be omitted.

In the drive control unit 200 according to this embodiment, a current command signal that reflects feedback from a drive unit (rotary encoders 60A to 60D) is generated by the position control unit 230 and the speed control unit 240 based on an operation command signal generated by the operation command generation unit 220 and is transmitted to the current control unit 260. It is to be noted that a current command signal to be transmitted to the current control unit 260 is a signal from which the frequency component of vibration has not been removed.

The gain adjustment unit 280 performs gain adjustment processing of reducing a gain to be used for amplification by the servo amplifier 270 with respect to a frequency component of vibration of a driven element A (driven element that requires control to suppress vibration) based on a signal received from the vibration state detection device 100, and transmits a gain rewrite signal to the current control unit 260. Such gain adjustment processing by the gain adjustment unit 280 corresponds to the filtering processing by the filtering processing unit 250 of the drive control unit 200 according to the first embodiment. It is to be noted that the gain can be set to zero in the control processing of reducing a gain, that is, the frequency component of vibration in the drive command signal can be configured not to be transmitted to the drive unit.

In the current control unit 260, a drive command signal is generated based on the current command signal and the present current signal fed back from the servo amplifier 270, is transmitted to the servo amplifier 270, is amplified by the servo amplifier 270 using a gain based on gain adjustment processing, is transmitted to the drive unit (servomotors 50A to 50D), and is driven and controlled.

In the drive control unit 200 according to the second embodiment, the gain adjustment unit 280 adjusts a gain for a frequency component of vibration of the driven element A based on the signal received from the vibration state detection device 100. As a result, even if external vibration associated with cutting is inputted as a disturbance to the control system of the drive unit (servomotors 50A to 50D), amplification of the drive command signal of the frequency component of the vibration is suppressed in the gain adjustment unit 280, and therefore, vibration of the drive unit (servomotors 50A to 50D) can be effectively prevented. Accordingly, it is possible to prevent vibration of the drive unit (servomotors 50A to 50D) from becoming large, and to prevent deterioration of the processing accuracy such as the surface roughness due to excessive vibration.

<Drive Control Processing>

Figure 7:
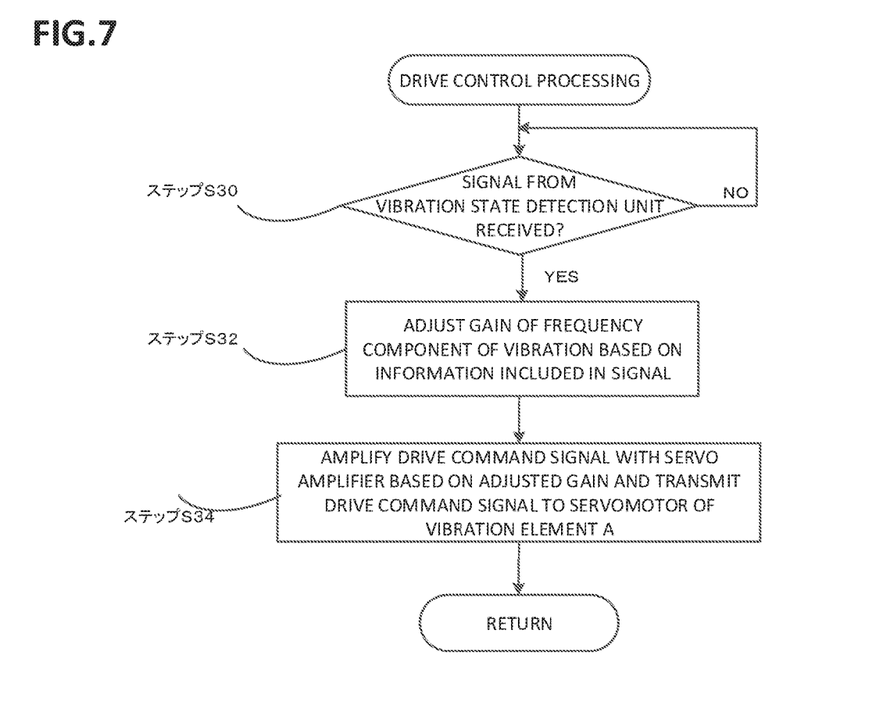
FIG. 7 is a flowchart illustrating an example of drive control processing to be carried out by the drive control unit according to the second embodiment of the present invention.

Next, gain adjustment processing by the gain adjustment unit 280 described above will be described with reference to a flowchart. FIG. 7 is a flowchart illustrating an example of drive control processing to be carried out by the drive control unit 200 according to the second embodiment of the present invention.

In FIG. 7, it is determined whether a signal has been received from the vibration state detection device 100 (step S30). It is to be noted that a standby state continues until a signal is received from the vibration state detection device 100. If it is determined in this determination that a signal has been received from the vibration state detection device 100 (YES), gain adjustment processing of reducing a gain to be used for amplification of a drive command signal is then performed for a frequency component of vibration of the driven element A based on information included in the received signal (step S32). A gain rewrite signal based on such gain adjustment processing is transmitted to the current control unit 260. Based thereon, the current control unit 260 transmits the drive command signal to the servo amplifier 270, and the servo amplifier 270 amplifies the drive command signal based on the adjusted gain and transmits the drive command signal to the drive unit (any one of servomotors 50A to 50D) of the driven element A (step S34).

As a result of such control, the frequency component of vibration of the driven element A in the amplified signal to be used for driving the drive unit is cut down, and therefore, vibration of the driven element A can be suppressed.

As described above, in the machine tool 2 including the vibration state detection device 100 (see FIG. 1) according to the first embodiment of the present invention and the drive control unit 200 (see FIG. 6) configured to feedback-control the drive unit according to the second embodiment of the present invention, the drive control unit 200 has the gain adjustment unit configured to reduce a gain to be used for amplification by the servo amplifier 270 in a frequency component of vibration of a driven element A in a drive command signal transmitted to the drive unit (any one of servomotors 50A to 50D) of the specified driven element A, and it is therefore possible to suppress vibration of the driven element A and thus vibration of the entire machine tool 2. This can prevent deterioration of the processing accuracy.

It is to be noted that the vibration state detection device 100 can be configured as an external device separate from the machine tool 2.

(Other Arrangement Examples of Imaging Device)

Figure 8:
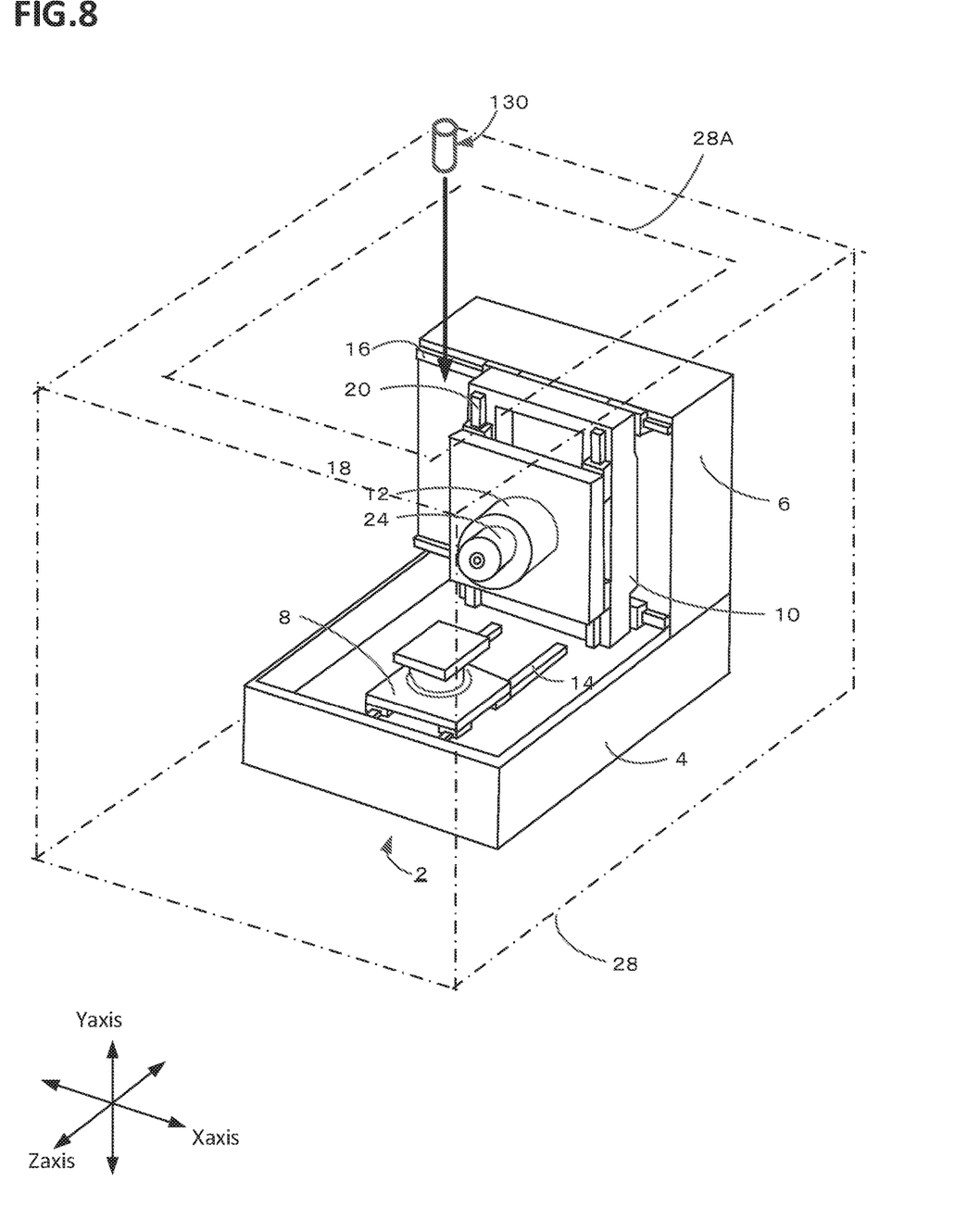
FIG. 8 is a perspective view schematically illustrating another arrangement example of an imaging device in a machine tool including a vibration state detection device of the present invention.
Figure 9:
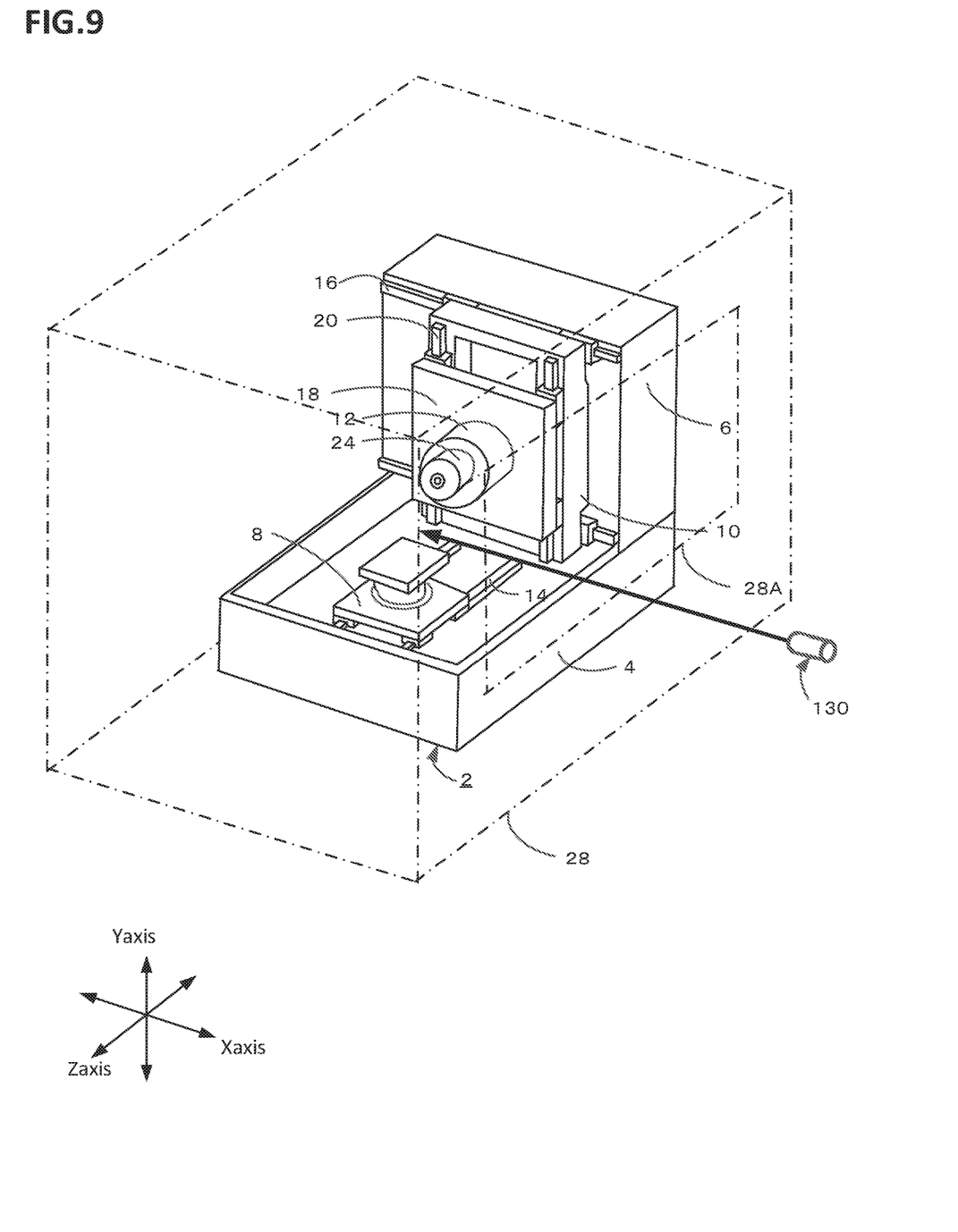
FIG. 9 is a perspective view schematically illustrating another arrangement example of an imaging device in a machine tool including a vibration state detection device of the present invention.

FIGS. 8 and 9 are perspective views each schematically illustrating another arrangement example of an imaging device in a machine tool including a vibration state detection device of the present invention.

The imaging device 130 is provided inside the machine tool 2 (cover 28) in the arrangement example illustrated in FIG. 2, while the arrangement example illustrated in FIGS. 8 and 9 is different therefrom in that the imaging device 130 is provided outside the machine tool 2 (cover 28).

In a case where the imaging device 130 is provided outside the machine tool 2 (cover 28), a problem that cutting oil, chips, or the like hits the lens or the like of the imaging device 130 does not occur, and the imaging device 130 can be held without being affected by vibration of the machine tool 2.

More specifically, in the arrangement example illustrated in FIG. 8, a translucent area 28A is provided in an upper surface of the machine tool 2 (cover 28), and the imaging device 130 disposed above the machine tool 2 is configured to image a driven element via the translucent area 28A. In the arrangement example illustrated in FIG. 8, the imaging device 130 is configured to image the driven element from the Y-axis direction. In such a case, the imaging device 130 is disposed to image the driven element from a direction different from the moving direction of the driven element in a case where the processing table 8 that moves in the Z-axis direction and the saddle 10 that moves in the X-axis direction are driven elements.

On the other hand, the imaging device 130 is disposed to image a driven element from the same direction as the moving direction of the driven element in a case where the spindle head 12 that moves in the Y-axis direction is a driven element.

In the arrangement example illustrated in FIG. 9, a translucent area 28A is provided in a side surface of the machine tool 2 (cover 28), and the imaging device 130 disposed beside the machine tool 2 is configured to image a driven element via the translucent area 28A. In the arrangement example illustrated in FIG. 9, the imaging device 130 is configured to image a driven element from the X-axis direction as in the arrangement example illustrated in FIG. 2. Hence, in a case where the processing table 8 that moves in the Z-axis direction and the spindle head 12 that moves in the Y-axis direction are driven elements, the imaging device 130 is disposed to image a driven element from a direction different from the moving direction of the driven element. On the other hand, the imaging device 130 is disposed to image a driven element from the same direction as the moving direction of the driven element in a case where the saddle 10 that moves in the X-axis direction is a driven element.

In either case, since the translucent area 28A is provided in the upper surface or the side surface of the machine tool 2 (cover 28), and the imaging device 130 is configured to image the driven element via the translucent area 28A, an image of the driven element can be reliably acquired even in a case where the imaging device 130 is disposed outside the machine tool 2 (cover 28).

Although embodiments or aspects of the present invention have been described, the disclosed contents may be modified in details of configuration, and combinations of elements, changes in order, or the like in embodiments or aspects can be realized without departing from the scope and spirit of the claimed invention.

REFERENCE SIGNS LIST 2 machine tool
4 bed
6 column
8 processing table
10 saddle
12 spindle head
14 guide rail
16 guide rail
18 spindle base
20 guide rail
24 main spindle
28 cover
28A translucent area
30 display device
50A to D servomotor
60A to D rotary encoder
100 vibration state detection device
110 vibration state analysis unit
120 driven element specification unit
130 imaging device
200 drive control unit
210 NC program storage unit
220 operation command generation unit
230 position control unit
240 speed control unit
250 filtering processing unit
260 current control unit
270 servo amplifier
280 gain adjustment unit

The invention claimed is:

1. A machine tool comprising:
a vibration state detection device comprising:
an imaging device configured to image a plurality of driven elements to be driven by a drive unit of a machine tool, a control device including a vibration state analysis unit, and a driven element specification unit, wherein:
the vibration state analysis unit configured to calculate a parameter corresponding to vibration of the driven element and including at least a vibration frequency, based on image data for each predetermined period of elapsed time acquired by the imaging device;
the driven element specification unit configured to specify one driven element requiring control to suppress vibration from the plurality of driven elements, using the parameter corresponding to the vibration, the parameter being calculated by the vibration state analysis unit; and
the imaging device is disposed to image the driven element from a direction different from a moving direction of the driven element when the driven element moves in translational motion;
and
a drive control unit configured to feedback-control the drive unit, wherein the drive control unit has a filtering processing unit configured to remove a frequency component of the vibration of the driven element, determined from the image data specified from a current command signal transmitted to the drive unit of the driven element specified.

2. The machine tool according to claim 1, wherein the imaging device is provided inside the machine tool.

3. The machine tool according to claim 1, wherein the imaging device is provided outside the machine tool.

4. The machine tool according to claim 3, further comprising a translucent area in an upper surface or a side surface of the machine tool, wherein
the imaging device images the driven element via the translucent area.

5. A machine tool comprising:
a vibration state detection device comprising:
  an imaging device configured to image a plurality of driven elements to be driven by a drive unit of a machine tool, a control device including a vibration state analysis unit, and a driven element specification unit, wherein:
  the vibration state analysis unit configured to calculate a parameter corresponding to vibration of the driven element and including at least a vibration frequency, based on image data for each predetermined period of elapsed time acquired by the imaging device;
  the driven element specification unit configured to specify one driven element requiring control to suppress vibration from the plurality of driven elements, using the parameter corresponding to the vibration, the parameter being calculated by the vibration state analysis unit; and
  the imaging device is disposed to image the driven element from a direction different from a moving direction of the driven element when the driven element moves in translational motion;
  and
  a drive control unit configured to feedback-control the drive unit, wherein the drive control unit has a gain adjustment unit configured to reduce a gain to be used for amplification of a frequency component of the vibration of the driven element, determined from the image data, specified in a current command signal transmitted to the drive unit of the driven element specified.

6. The machine tool according to claim 5, wherein the imaging device is provided inside the machine tool.

7. The machine tool according to claim 5, wherein the imaging device is provided outside the machine tool.

8. The machine tool according to claim 7, further comprising a translucent area in an upper surface or a side surface of the machine tool, wherein
  the imaging device images the driven element via the translucent area.

* * * * *

UNITED STATES PATENT AND TRADEMARK OFFICE
CERTIFICATE OF CORRECTION

PATENT NO. : 10,994,385 B2
APPLICATION NO. : 16/480438
DATED : May 4, 2021
INVENTOR(S) : Yasutaka Kato et al.

Page 1 of 1

It is certified that error appears in the above-identified patent and that said Letters Patent is hereby corrected as shown below:

In the Specification

Column 1, Line 4, Below "DEVICE" insert -- CROSS-REFERENCE TO RELATED APPLICATIONS --

In the Claims

Column 12, Line 56, Claim 1, delete "data" and insert -- data, --

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*